United States Patent
Cooke et al.

[11] Patent Number: 5,805,329
[45] Date of Patent: Sep. 8, 1998

[54] MINIMIZING RADIATION DAMAGE IN NONLINEAR OPTICAL CRYSTALS

[75] Inventors: D. Wayne Cooke, Santa Fe; Bryan L. Bennett, Los Alamos; Nigel J. Cockroft, Santa Fe, all of N. Mex.

[73] Assignee: The Regents of the University of California, Los Alamos, N. Mex.

[21] Appl. No.: 630,305

[22] Filed: Apr. 10, 1996

[51] Int. Cl.⁶ .............................. G02F 1/03; G02F 1/29; H01L 23/02
[52] U.S. Cl. .......................... 359/254; 359/245
[58] Field of Search .................... 359/241, 248, 359/249, 254, 265, 269; 345/49, 105

[56] References Cited

U.S. PATENT DOCUMENTS

| | | | |
|---|---|---|---|
| 4,886,345 | 12/1989 | Popeh | 359/266 |
| 5,083,221 | 1/1992 | Toyoder et al. | 359/245 |
| 5,504,616 | 4/1996 | Shinozaki et al. | 359/326 |
| 5,561,549 | 10/1996 | Hatori et al. | 359/319 |

OTHER PUBLICATIONS

Quagliano et al, Advanced Solid State Laser Conf., Jan. 29, 1995, 9 pp.; Abst. only herewith.

*Primary Examiner*—Nelson Moskowitz
*Attorney, Agent, or Firm*—Milton D. Wyrick

[57] ABSTRACT

Methods are disclosed for minimizing laser induced damage to nonlinear crystals, such as KTP crystals, involving various means for electrically grounding the crystals in order to diffuse electrical discharges within the crystals caused by the incident laser beam. In certain embodiments, electrically conductive material is deposited onto or into surfaces of the nonlinear crystals and the electrically conductive surfaces are connected to an electrical ground. To minimize electrical discharges on crystal surfaces that are not covered by the grounded electrically conductive material, a vacuum may be created around the nonlinear crystal.

1 Claim, 5 Drawing Sheets ively high power radiation over a
MINIMIZING RADIATION DAMAGE IN NONLINEAR OPTICAL CRYSTALS The invention was made with Government support under Contract No. W-7405-ENG-36 awarded by the U.S. Department of Energy. The Government has certain rights in the invention.

FIELD OF THE INVENTION

The present invention generally relates to nonlinear optical crystals, and, more specifically, to methods for minimizing the damage to nonlinear optical crystals brought about by optical radiation.

BACKGROUND OF THE INVENTION

Nonlinear optical crystals are used extensively throughout the world in a great many optical applications. But for problems associated with radiation damage, their use would be even greater. Currently, the most common use of nonlinear crystals appears to be as second harmonic generators (SHGs) and as optical parametric oscillators (OPOs).

Most of the nonlinear crystals now being produced are capable of handling relatively high power radiation over a limited period of time. The useful lifetime of these nonlinear crystals is limited because the large electric fields associated with most crystal applications cause, over time, electrochromic and photochromic damage to the crystal. This progressive damage can severely limit the average-power use of these expensive crystals.

Single crystal $KTiOPO_4$ (KTP) probably is the most widely used nonlinear optical material currently available. The excellent crystal stability and large nonlinear optical coefficient make KTP crystals the material of choice for both SHG and OPO applications. Because of the extensive use of KTP crystals, the radiation damage suffered by most nonlinear crystals is documented extensively for KTP crystals.

In the approximately twenty years which have elapsed since the commercialization of KTP crystals, a great deal of work has been devoted to understanding the origin of this radiation damage and developing effective methods for mitigating its effects. This radiation damage, also referred to as "photochromic damage" or "gray tracking," previously has been thought to occur when an oxygen-hole pair is generated and the electron is trapped on a $Ti^{4+}$ ion, creating a stable $Ti^{3+}$ ion. Optical absorption of $Ti^{3+}$ ions occurs in the green region of the spectrum, and has been thought to be responsible for the gray tracking problem.

In SHG applications, the converted green light (~530 nm) was considered to be absorbed by the $Ti^{3+}$, leading to heating and eventual fracture of the KTP crystal. It was postulated that the above-gap energy necessary for the creation of an oxygen-hole/electron pair can result from either sum-frequency mixing of the fundamental and second harmonic frequencies, sum frequency mixing of the Raman-shifted fundamental and second harmonic frequencies, or direct two-photon absorption of the generated green light.

Electrochromic damage in nonlinear crystals generally occurs when exposed to electric fields of a few kV/cm for a period of time. After a threshold field has been reached, the crystal breaks down, and green/black streaks appear in the material along the direction of the applied field. These streaked areas in the crystals exhibit absorption similar to the gray-tracked material, suggesting the conclusion that, in KTP crystals, the $Ti^{3+}$ ions were associated with the damage.

When damaged crystals were cut open, an internal examination revealed an excess of Ti and K on the crystal's surface, and a deficiency of these elements in the internal regions. This finding led to the conclusion that Ti and K migrate under the application of a sufficiently strong electric field, and that the electrochromic damage was most likely a combination of bulk damage caused by this migration and the concomitant creation of $Ti^{3+}$ ions in the KTP crystal. The present invention teaches that this is not the damage mechanism.

It is therefore an object of the present invention to provide methods for minimizing or preventing electrochromic damage to nonlinear crystals.

It is another object of the present invention to provide apparatus for allowing the electrical grounding of crystals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided a method of minimizing electrochromic damage in nonlinear crystals comprising the steps of placing an electrical conductor in close proximity to the nonlinear crystal, and grounding the electrical conductor.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides methods for minimizing electrochromic damage in nonlinear crystals. Although the general solution to minimizing this very important problem in the industrial application of these crystals may seem simple, the route to discovering this solution has been most difficult.

The reasons for photochromic damage in nonlinear crystals have eluded researchers since soon after the introduction of these crystals. These nonlinear crystals are known to produce what has been generally termed "pyroelectric luminescence," and are generally classed as pyroelectric crystals. Under appropriate conditions, electrical discharge may occur in any pyroelectric crystal, a term which includes all nonlinear crystals.

Figure 1:
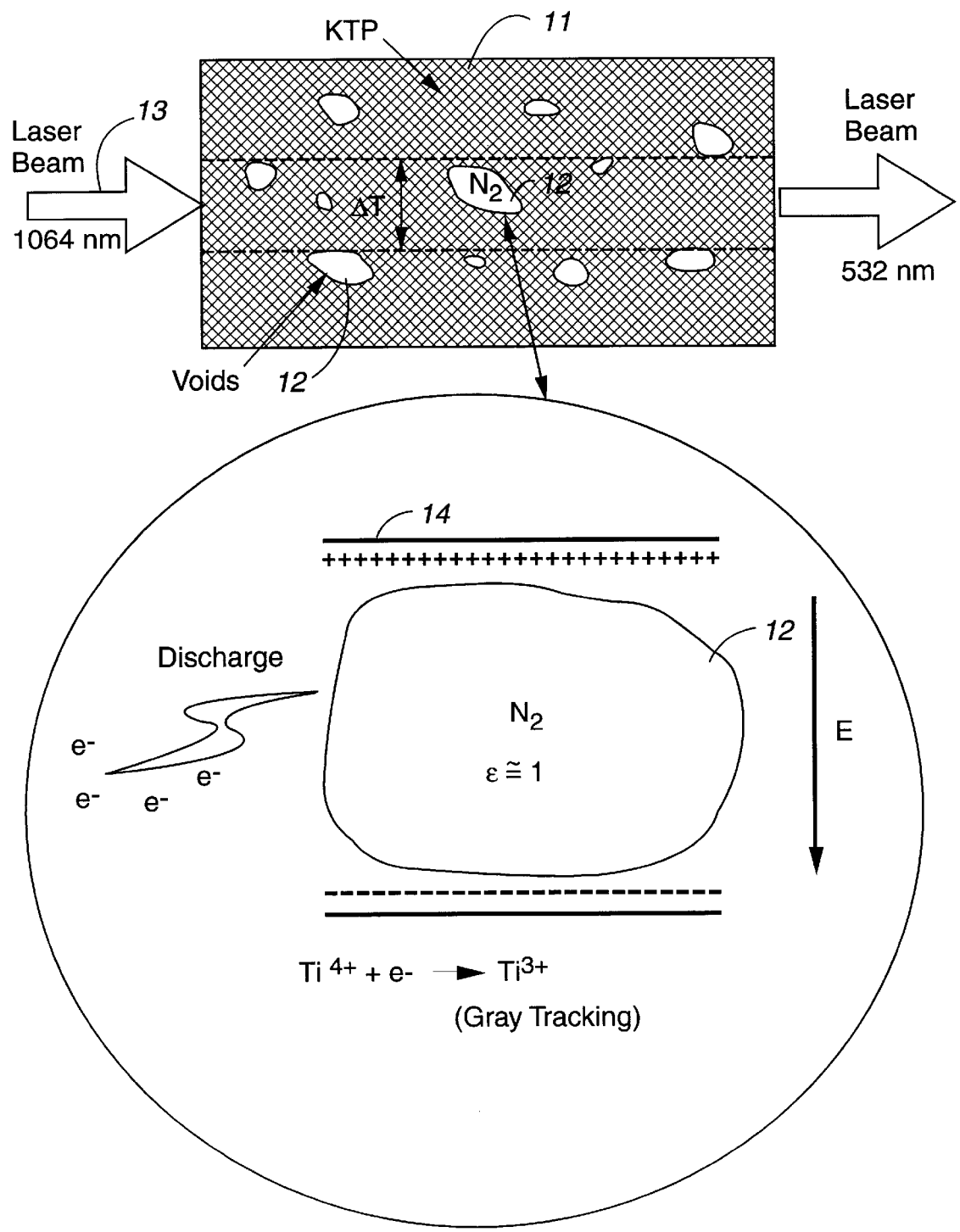
FIG. 1 is a schematical representation of a nonlinear crystal being radiated with a laser beam, with representations of void areas within the crystal containing entrained nitrogen, along with an enlargement illustrating the electric field created within the crystal and the electronic combination which results in gray tracking in the crystal.

Reference should now be made to FIG. 1, where nonlinear crystal 11 is schematically illustrated. It now has been shown that currently produced nonlinear crystals 11 contain voids 12 which contain entrained nitrogen. The incidence of laser beam 13 onto nonlinear crystal 11 and its interaciton with voids 12 produces the situation shown in the enlargement also illustrated in FIG. 1.

The incidence of laser beam 13 produces heating in central portion 11a of nonlinear crystal 11 while laser beam 13 is on, and cooling when laser beam 13 is off. Voids 12, as stated, have been shown to contain entrained molecular nitrogen, which has a dielectric constant of approximately 1 ($\epsilon \sim 1$), compared to typical specimens of nonlinear crystal 11 having dielectric constants in the range of $\epsilon \sim 10$ to 50. The random discharges observed in nonlinear crystals 11 upon heating or cooling, measured as pyroelectric luminescence, occur at voids 12.

Voids 12 can be viewed, as shown in the enlargement in FIG. 1, as parallel plate capacitor 14 enclosing void 12. Capacitors 14 store the charge generated by the changing temperature of nonlinear crystal 11. Since nonlinear crystals 11 have a finite conductivity, capacitors 14 will gradually discharge over time.

Pyroelectric crystals in general, develop an internal electric field due to changes in the spontaneous polarization as a function of temperature according to the following:

$$i = \frac{dP_s}{dt} = \frac{dP_s}{dT} \frac{dT}{dt} = \lambda_T \beta \qquad 10$$

where i is the current generated due to the electric field, $\lambda_T$ is the pyroelectric coefficient and $\beta$, is the heating rate. When nonlinear crystal 11 is heated or cooled, an electric field, E, is generated within nonlinear crystal 11. The pyroelectric coefficient of nonlinear crystal 11 is related to this field as follows:

$$\lambda_T = \epsilon_0 \epsilon \frac{dE}{dT} \qquad 20$$

where $\epsilon$ is the dielectric constant of the medium. It is thereby seen that a changing temperature acts as the generator of net charge developed within nonlinear crystal 11, and the accompanying field, E, may reach sufficient value to discharge. It is this buildup of electric field, E, and its subsequent discharge that produces current flow across pyroelectric crystals, accompanied by optical emission.

It has been shown that regardless of the ambient environment of nonlinear crystal 11 or the particular type of nonlinear crystal 11 being investigated, this optical emission is always characterized by discrete spectral lines (band heads) in the near ultraviolet and visible portion of the electromagnetic spectrum and are due to ionization of molecular nitrogen entrained within voids 12.

As previously explained, these electrical discharges can occur within any nonlinear crystal 11 and are the vehicle which produces the electrochromic damage over time. This thermally-induced damage, which can be produced by the rapid local heating caused by laser beam 13, or by any thermal cycling procedure, will be detrimental to the attractive optical properties of nonlinear crystals 11.

As an example, potassium titanyl phosphate (KTP) nonlinear crystals 11 are used extensively for frequency doubling Nd:YAG lasers shown in FIG. 1. Laser beam 13 is incident at a wavelength 1064 nm, and output from nonlinear crystal 11 at a wavelength of 532 nm. The principal limitation on the application of KTP nonlinear crystals 11 in high power laser applications is laser-induced damage known as "gray tracking." Although KTP crystals were developed in 1976, the origin of this gray tracking problem has not been known.

The present invention teaches that gray tracking primarily results from the heating and subsequent cooling produced in nonlinear crystal 11 by pulsed lasers. These heating and cooling cycles produce the electrical discharges described above in the low dielectric constant voids 12 which contain entrained molecular nitrogen. The ionization process caused by these electrical discharges produces free electrons, probably from oxygen atoms, which are captured by $Ti^{4+}$ ions of the KTP crystal lattice, converting the $Ti^{4+}$ ions to $Ti^{3+}$ ions.

The $Ti^{3+}$ ions absorb in the green portion of the electromagnetic spectrum, which is also the wavelength of the frequency-doubled light, 532 nm. This process quickly leads to catastrophic damage to nonlinear crystal 11 because green light is being produced and simultaneously absorbed by nonlinear crystal 11.

It is worthy of note that minimal damage to nonlinear crystal 11 occurs with a cw laser beam 13. However, with pulsed laser beams 13, catastrophic damage occurs. The reason for this effect is that under cw operation, there is no change in spontaneous polarization with temperature, except at the beginning and end of laser excitation. With cw operation, dynamic equilibrium is quickly attained, and $dP_s/dt$ becomes zero. However, this is not true for pulsed laser operation, where $dP_s/dt$ is dependent on the laser pulse rate, causing $dP_s/dt$ to be nonzero. For high power applications of nonlinear crystal 11, pulsed laser operation is required.

Currently, the usefulness of KTP nonlinear crystals in frequency doubling applications is limited by the laser-induced damage problem. The present invention teaches that one way of minimizing the laser-induced damage is to dissipate the electrical charge that builds up as a result of laser heating. When this is done efficiently, the radiation damage of gray tracking can be minimized. The general method taught by the present invention is electrical grounding of nonlinear crystal 11 to quickly drain excess electrical charge away from nonlinear crystal 11.

Figure 2:
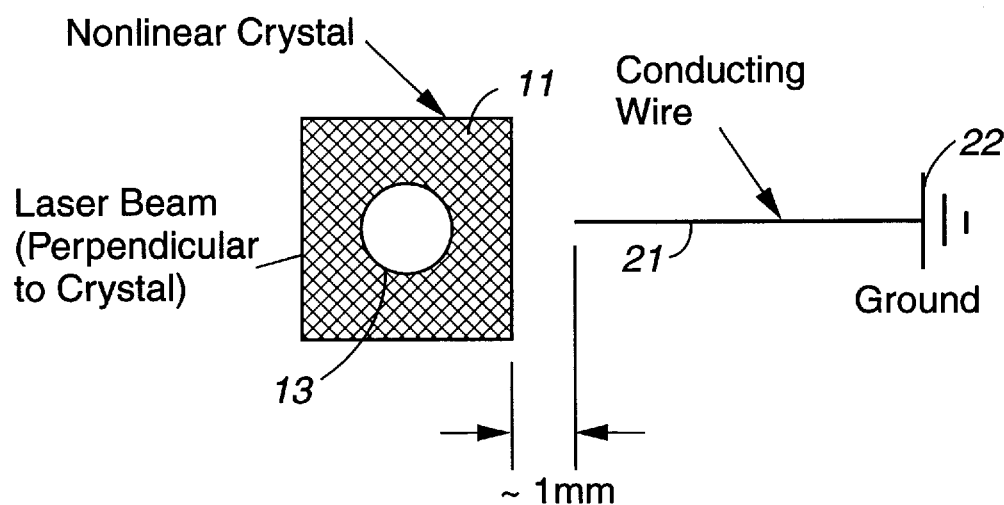
FIG. 2 is a schematical representation of a rectangular cross-section nonlinear crystal with a grounding wire placed in close proximity to the crystal, and a laser beam being perpendicular to the crystal.

To accomplish this grounding of nonlinear crystal 11 reference should be directed toward FIGS. 2–5. In FIG. 2, perhaps the easiest method of providing a ground to existing nonlinear crystals 11 is to place an electrically conductive material 21, such as a copper, aluminum, silver or gold wire, within 1 to 2 mm of nonlinear crystal 11, and to connect the opposite end to ground 22. This configuration is similar to the operation of a lightning rod.

Figure 3:
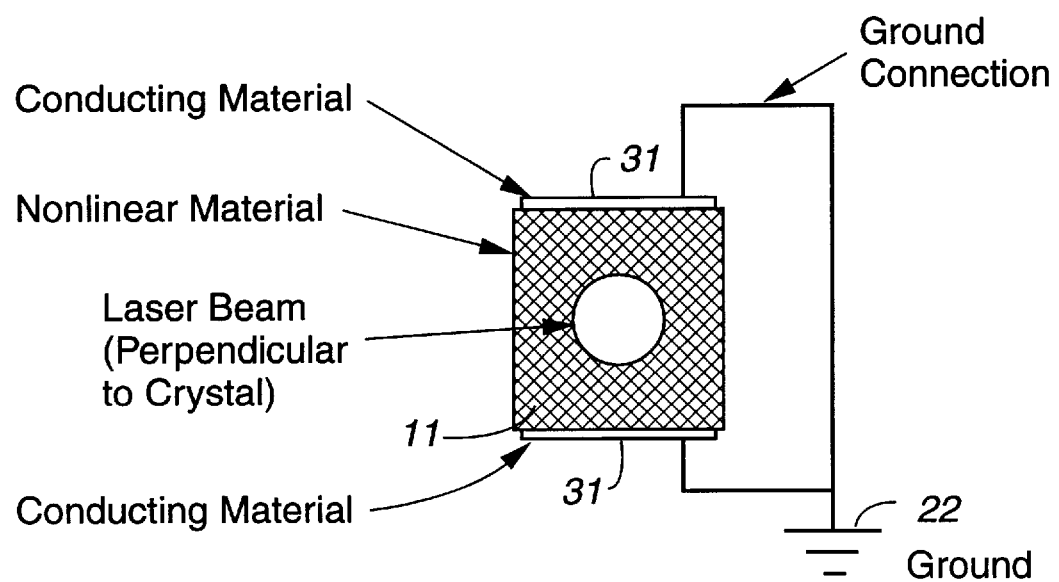
FIG. 3 is a schematical representation of a square cross-section nonlinear crystal with a conducting material placed on two faces of the crystal, the conducting material being grounded and a laser beam being perpendicular to the crystal.

Nonlinear crystals 11 are typically in form of a parallelepiped, approximately 3 mm×3 mm×5 mm. FIG. 3 illustrates another grounding method appropriate for such a configuration in which electrically conductive material 31 is applied to two opposite surfaces of nonlinear crystal 11 which are parallel to laser beam 13. Electrically conductive material 31 is connected to ground 22 in any convenient manner.

Figure 4:
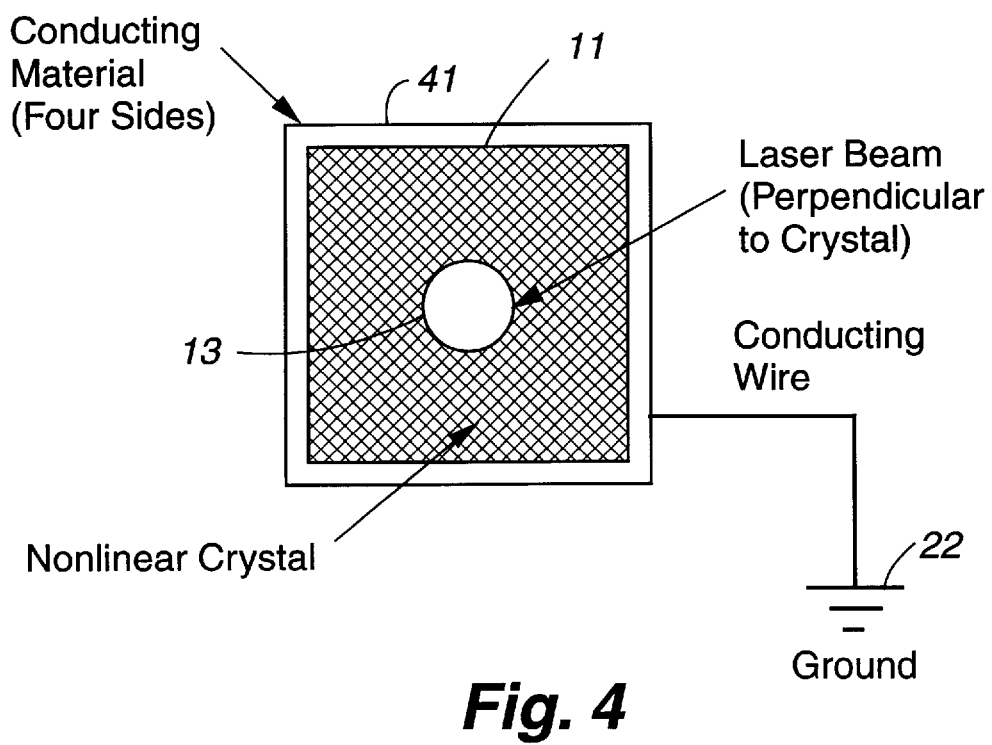
FIG. 4 is a schematical representation of a square cross-section nonlinear crystal with conducting material placed on four faces of the crystal, a single connection to ground and a laser beam being perpendicular to the crystal.

FIG. 4 illustrates another grounding method in which electrically conductive material 41 is applied to all four faces of nonlinear crystal 11. As in FIG. 3, electrically conductive material 41 is parallel to laser beam 13. This method brings with it a likelihood of quickly discharging any electric fields within nonlinear crystal 11.

Figure 5:
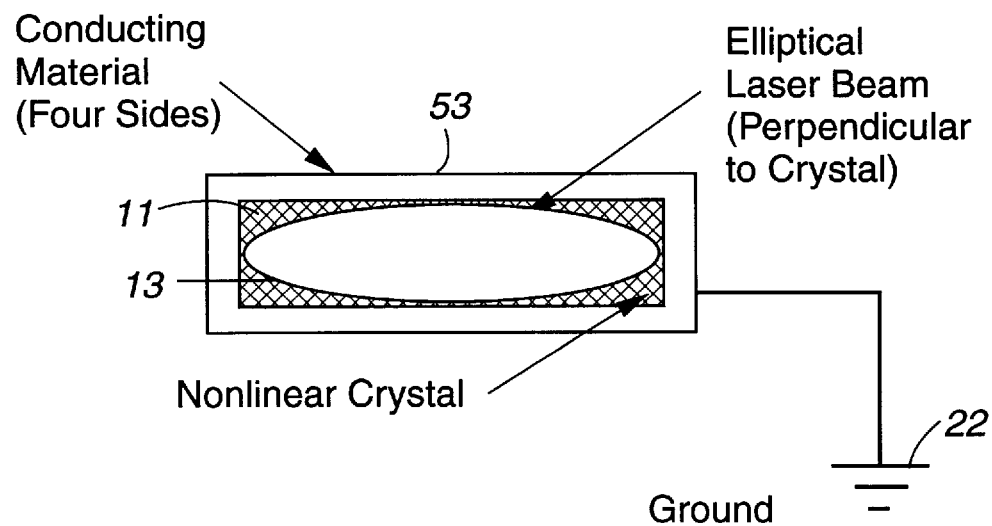
FIG. 5 is a schematical representation of a rectangular cross-section nonlinear crystal with conducting material placed on four faces of the crystal, a single connection to ground, and an elliptical laser beam being perpendicular to the crystal.

FIG. 5 illustrates a configuration for nonlinear crystal 11 which would improve the power density in nonlinear crystal 11 when employed in frequency doubling applications. As seen in FIG. 5, laser beam 13 is elliptical, and for this application would have a thickness of only a few hundred micrometers. Similarly, nonlinear crystal 11 is only slightly thicker than laser beam 13. Electrically conductive material 53 is applied to all four sides of nonlinear crystal 11 and connected to ground 22. Additionally, nonlinear crystal 11 can be mounted onto an electrically conductive surface, such as a copper block, which is also connected to ground 22.

The configuration of FIG. 5 is important to frequency doubling applications because in those applications maximizing power density is important. However, with increased power density, laser-induced heating will also be proportionally increased. For this reason, it is important that electrical charges be removed quickly. To accomplish rapid charge removal, it is necessary to have grounded electrically conductive material 53 as close to the region of nonlinear crystal 11 in which charges build up as possible. A thin elliptical laser beam 13 and a thin parallelepiped nonlinear crystal 11 allow close proximity between the charges and electrically conductive material 53, enhancing the rate of removal of rapidly induced electrical charge, and minimizing radiation damage to nonlinear crystal 11.

In the embodiments shown in FIGS. 3, 4 and 5, it may be advantageous to also deposit electrically conductive material 31 (FIG. 3), 41 (FIG. 4) and 53 (FIG. 5) on the portion of the surfaces of nonlinear crystal 11 which are perpendicular to laser beam 13 and which is not in the path of laser beam 13. This provides grounding to at least a portion of all six surfaces of nonlinear crystal 11 to increase the rate of charge dissipation.

Electrically conductive material 31 (FIG. 3), 41 (FIG. 4) and 53 (FIG. 5) may comprise any suitable electrically conductive material, including, but not limited to copper, aluminum, silver and gold. These materials may be applied to nonlinear crystal 11 in any appropriate manner. For instance, sheets of electrically conductive material 31 (FIG. 3), 41 (FIG. 4) and 53 (FIG. 5) could be clamped onto nonlinear crystals 11. Alternatively, electrically conductive material 31 (FIG. 3), 41 (FIG. 4) and 53 (FIG. 5) could be deposited onto nonlinear crystal 11 by chemical or physical deposition techniques. Additionally, electrically conductive material 31 (FIG. 3), 41 (FIG. 4) and 53 (FIG. 5) can be diffused into nonlinear crystal 11 so that it is in closer proximity to the region affected by laser beam 13. This diffusion also would improve the rate at which electrical charge could be dissipated.

Connecting electrically conductive material 31 (FIG. 3), 41 (FIG. 4) and 53 (FIG. 5) to ground 22 can be made in any appropriate manner. For example, one surface of nonlinear crystal 11 could simply be in physical contact with a grounded electrically conductive block. Alternatively, a wire compatible with electrically conductive material 31 (FIG. 3), 41 (FIG. 4) and 53 (FIG. 5) could be attached and connected to ground 22. In this case, the distance from nonlinear crystal 11 to ground 22 should be kept to a minimum.

It has been shown that electrical discharges in nonlinear crystals 11 can occur both in internal regions and regions near the surfaces. These near surface discharges will be dissipated in all regions near or covered by electrically conductive material 31 (FIG. 3), 41 (FIG. 4) or 53 (FIG. 5). Those regions which are distant or not covered may still be able to damage nonlinear crystals 11. To also minimize this damage, nonlinear crystals 11 could be placed into an evacuated enclosure. The associated vacuum could be in the range of $10^{-5}$ to $10^{-6}$ Torr.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of minimizing electrochromic and photochromic damage in nonlinear crystals caused by a laser beam comprising the steps of:

placing electrically conductive material in close proximity to said nonlinear crystal;

grounding said electrically conductive material; and creating a vacuum around said nonlinear crystal and said electrically conductive material.

\* \* \* \* \*